(12) United States Patent
Vanmoor

(10) Patent No.: US 6,530,365 B2
(45) Date of Patent: Mar. 11, 2003

(54) FLUID DISPLACEMENT PUMP WITH BACKPRESSURE STOP

(76) Inventor: Arthur Vanmoor, 22 SE. 4th St. P.B.M. 219, Boca Raton, FL (US) 33432

( * ) Notice: Subject to any disclaimer, the term of this patent is extended or adjusted under 35 U.S.C. 154(b) by 0 days.

(21) Appl. No.: 09/780,302

(22) Filed: Feb. 9, 2001

(65) Prior Publication Data

US 2001/0009150 A1 Jul. 26, 2001

Related U.S. Application Data

(62) Division of application No. 09/503,665, filed on Feb. 14, 2000.

(30) Foreign Application Priority Data

May 18, 1999 (NL) .................................... 10/2083

(51) Int. Cl.[7] .............................................. F02B 33/36
(52) U.S. Cl. .................................. 123/559.1; 418/201.1
(58) Field of Search ................... 123/204, 221, 123/559.1, 238; 418/201.1, 197

(56) References Cited

U.S. PATENT DOCUMENTS

| 53,915 | A | | 4/1866 | Behrens |
|---|---|---|---|---|
| 143,936 | A | | 8/1873 | Spencer et al. |
| 1,135,648 | A | * | 4/1915 | Ahlm et al. ............... 123/238 |
| 1,191,423 | A | * | 7/1916 | Holdaway ................ 418/201.1 |
| 1,287,268 | A | * | 12/1918 | Edwards ................... 418/201.1 |
| 1,298,140 | A | | 3/1919 | Workman |
| 1,597,411 | A | | 8/1926 | Kinney |
| 2,095,167 | A | * | 10/1937 | Burghauser ................. 418/197 |
| 2,189,728 | A | | 2/1940 | Daniels |
| 2,586,842 | A | | 2/1952 | McCallum |
| 2,627,161 | A | | 2/1953 | Lindhagen et al. |
| 2,652,192 | A | | 9/1953 | Chilton |
| 2,691,482 | A | | 10/1954 | Ungar |
| 2,804,260 | A | | 8/1957 | Nilsson et al. |
| 2,896,409 | A | | 7/1959 | Heiman |
| 2,924,181 | A | * | 2/1960 | Sennet ....................... 418/197 |
| 2,975,963 | A | | 3/1961 | Nilsson et al. |
| 3,424,373 | A | | 1/1969 | Gardner |
| 3,467,300 | A | | 9/1969 | Schibbye |
| 3,614,275 | A | | 10/1971 | Eibsen |
| 3,693,601 | A | * | 9/1972 | Sauder ....................... 123/238 |
| 3,807,911 | A | | 4/1974 | Caffrey |
| 4,012,903 | A | | 3/1977 | Riedl |
| 4,710,110 | A | | 12/1987 | Paulus |
| 5,829,957 | A | | 11/1998 | Ozaki et al. |

FOREIGN PATENT DOCUMENTS

| CH | 111009 | 11/1925 |
|---|---|---|
| CH | 214554 | 7/1941 |
| FR | 1012669 | 4/1952 |
| GB | 889246 | 2/1962 |
| JP | 05-195808 | 8/1993 |

* cited by examiner

Primary Examiner—Michael Koczo
(74) Attorney, Agent, or Firm—Laurence A. Greenberg; Werner H. Stemer; Gregory L. Mayback

(57) ABSTRACT

The fluid displacement pump enables substantially continuous pumping from a low-pressure side to a high-pressure side substantially without any backflow or backpressure pulsations. Liquid or gas is injected to the high-pressure side by way of mutually intertwined worm spindles that form a fluidtight displacement system. The blades of the impeller system are almost flat, i.e., their attack angle relative to backpressure is close to perpendicular so that they will turn quite freely in the forward direction, but will not be turned backwards by a pressurized backflow. The impeller rotation that is introduced via the spindle shafts nevertheless leads to a volume displacement towards the high-pressure side, for instance, towards a chamber to be pressurized or to be subjected to equal pressure. The impeller system can be driven with variable speed, which translates proportionally in a variable pressure buildup.

12 Claims, 4 Drawing Sheets

FLUID DISPLACEMENT PUMP WITH BACKPRESSURE STOP

CROSS-REFERENCE TO RELATED APPLICATION

This a division of my copending application Ser. No. 09/503,665, filed Feb. 14, 2000.

BACKGROUND OF THE INVENTION

Field of the Invention

The invention relates to fluid displacement pumps, specifically for use with air and water, and to the utilization of such pumps for gas compression pumps in internal combustion engines and turbine engines.

Fluid displacement pumps are subject to a variety of applications in engineering. For instance, such pumps are utilized in compression systems such as air compressors and as fluid pumps. For example, British Patent Specification 265,659 to Bernhard discloses an internal combustion engine with fuel pressurization separate from the combustion chamber. There, fuel is pressurized in a compressor and the pressurized fuel is fed from the pump to the engine through a port assembly.

Where such fluid displacement pumps are utilized in compression systems, it is important that the pump is directed from the low-pressure side to the high-pressure side. Continuous backflow and/or backpressure pulsations must be prevented so as to assure efficient operation of the attendant system. In an electrical equivalent diagram, the pump would in effect be modeled as a diode and power source.

SUMMARY OF THE INVENTION

It is an object of the invention to provide a fluid displacement pump, which overcomes the disadvantages of the heretofore-known devices and methods of this general type and which is further improved in terms of efficiency and backflow prevention, and which allows essentially continuous pumping output with negligible backflow.

With the foregoing and other objects in view there is provided, in accordance with the invention, a fluid displacement pump, comprising:

a housing formed with a chamber having walls defined by two parallel, mutually intersecting cylindrical openings defining respective cylinder axes; and a double helix spindle impeller for pumping a fluid through the chamber, the double helix spindle impeller being rotatably mounted about respective axes coaxial with the cylinder axes and having blades sealing against the walls and engaging into one another so as to form a substantially completely closed wall within the chamber during a rotation of the impeller.

In accordance with an added feature of the invention, the blades of one helix of the double helix are spaced apart by a distance defined by the blades of the other helix of the double helix.

In accordance with an additional feature of the invention, the blades enclose an angle of between approximately 45° and almost 90° with the cylinder axes.

With the above and other objects in view there is also provided, in accordance with the invention, an internal combustion engine, comprising:

an engine block formed with a combustion chamber;

an input system communicating with the combustion chamber for injecting a combustion fluid under increased pressure into the combustion chamber, the input system including a double helix spindle impeller for pumping air into the combustion chamber, and a housing opening with walls sealing against the double helix spindle impeller;

a power output system connected to the combustion chamber for converting energy released in a combustion reaction in the combustion chamber into mechanical work.

In accordance with another feature of the invention, the housing opening is formed with two intersecting circular arches substantially corresponding to a periphery of the impeller and substantially air-tightly sealing off the housing opening.

The displacement pump system disclosed here provides for a substantially continuous fluid flow, such as air flow into the combustion chamber with a minimum in pulsations. Any backpressure from the combustion chamber into the air intake is safely blocked off by the walls of the double-impeller system. At least one continuous wall, preferably two complete walls, are at all times established by the rotating impeller blades and the relative alignment of the impellers.

One of the important features is that the blades of the impeller system are almost flat, i.e., their attack angle relative to backpressure is close to perpendicular so that they will not be turned by a pressurized backflow. The impeller rotation that is introduced via the spindle shafts, however, leads to a volume displacement towards the chamber to be pressurized. The impeller system can be driven with variable speed, which translates proportionally in a variable fluid displacement and/or to a variable pressure buildup.

Other features which are considered as characteristic for the invention are set forth in the appended claims.

Although the invention is illustrated and described herein as embodied in a fluid displacement pump with backflow stop, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
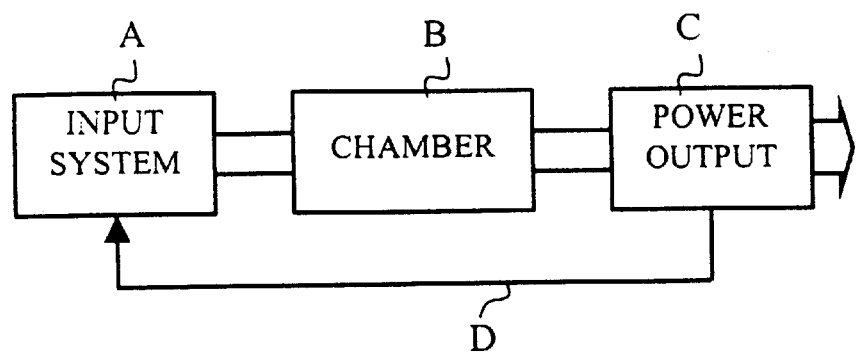
FIG. 1A is a schematic view of an internal combustion engine with three separate systems, namely an input system according to the invention, a combustion chamber, and an output system.
Figure 1B:
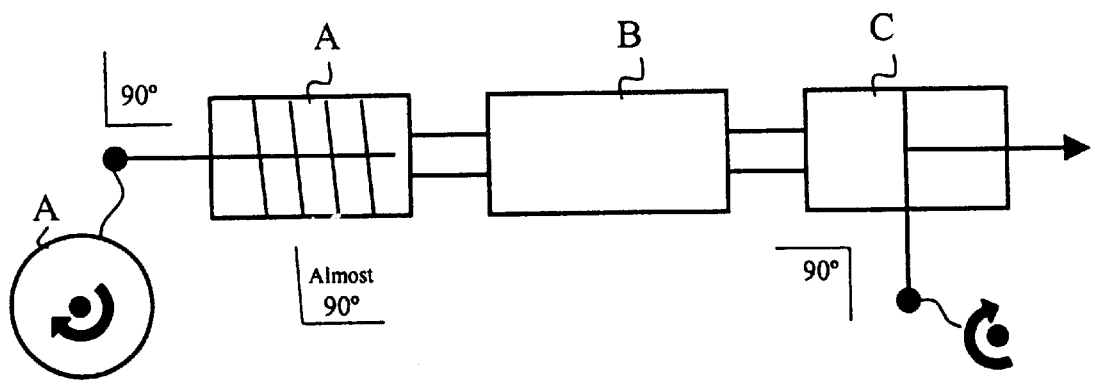
FIG. 1B is a slightly more schematic view of the internal combustion engine with the fluid displacement pump according to the invention.

Referring now to the figures of the drawing in detail and first, particularly, to FIGS. 1A and 1B thereof, there is seen an exemplary application of the pump according to the invention. The associated engine and the system as a whole is described in detail in my copending parent application Ser. No. 09/503,665, now U.S. Pat. No. 6,257,195, the disclosure of which is herein incorporated by reference. The system consists of three separate parts, namely the input system/air displacement system A, a combustion chamber B, and a power output system C. The power output system is also a displacement system with the power output perpendicular to the blades of the input system. The power output of the output system C is partially fed back to the input system so as to drive the continuous air-fuel injection. The feedback is effected by a mechanical link D with optionally variable pressure generation, i.e., variable compression.

It is important for the system of the invention that, while the input system A is open towards the combustion chamber B, the same is not true for the reverse. The impeller injection system which will be described below satisfies this requirement.

An important feature of the novel system is the disposition and alignment of the air (or air-fuel) injection system, namely a rotary system which will close off the air injection intake pipe substantially air-tightly and which will not be subject to backpressure resistances. The main output vector, as shown at the output system C is substantially perpendicular to the alignment of the air injection system. Accordingly, the power output, which is parallel to the output force vector in the mechanical system, must necessarily be virtually exclusively through the power output system.

Figure 2:
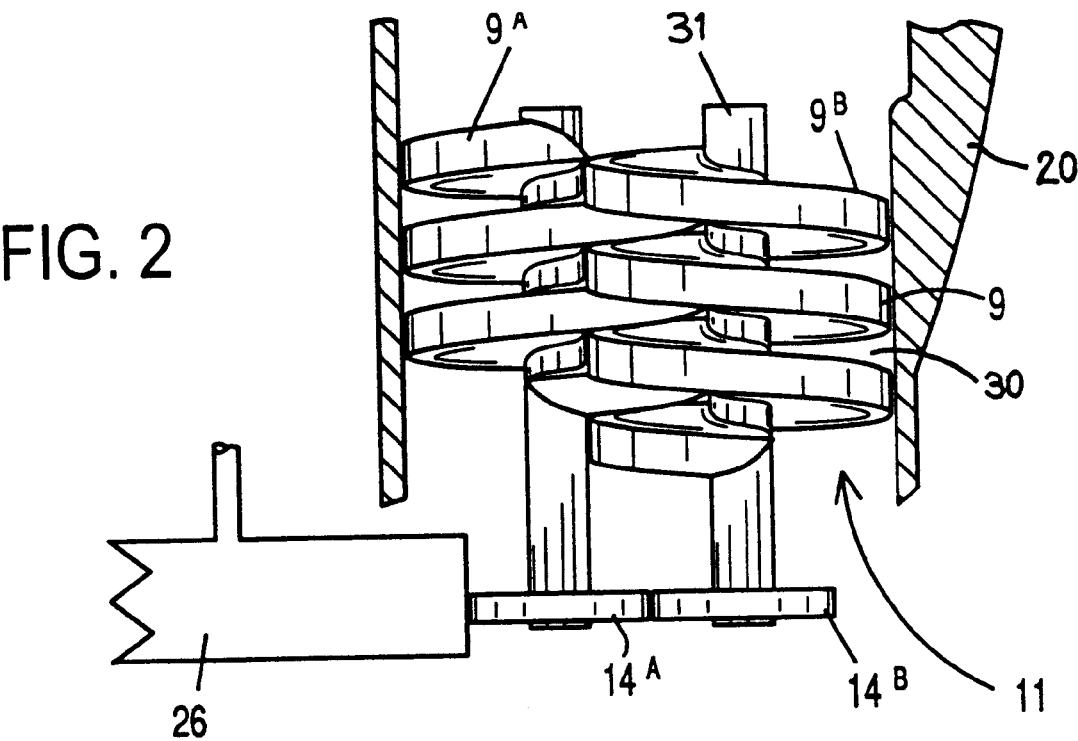
FIG. 2 is a partial view of a fluid displacement pump with a variable speed drive system.

Referring now to FIG. 2, there is shown a double impeller system, with a first impeller 9A driven by a first gear 14A and a second impeller 9B driven by a second gear 14B. The impeller embodiment is a positive displacement system and, at the same time, a back-pressure membrane. As the ribbed impellers rotate, the air flow 11 is "packaged" into chamber 30 formed between the impeller axle 31, the wall 20, and the blades 9B. Following the helical path of the chamber 30, it is closed off by the blade 9A of the adjacent impeller structure. Depending on the rotational speed of the impeller system and the size of the chambers 30, the impellers 9A and 9B form a pressure pump with positive displacement towards a high-pressure chamber. The air flow 11 is at a lesser pressure than in the high-pressure chamber. As the blades 9A and 9B of the impeller rotate, various vertically stacked chambers are opened and closed so that it will result in a positive flow from the bottom to the high-pressure side at the top. At the same time, any pulsations and explosions due, for example, to a combustion of fuel in a chamber on the high-pressure side will be prevented from flowing back past the blades 9A and 9B. In other words, the impeller pump is always closed with regard to a direct backflow of the fluid out from the high-pressure side.

The impellers 9A and 9B may be driven at variable speed. For example, a toothed rack may be provided or a clutch system to drive the gear 26. Any type of speed control may be implemented for the impeller system. It is also possible, of course, the drive the shafts 31 directly with direct drive motors. The two spindles are engaged with the meshing gear wheels 14A and 14B.

Figure 3:
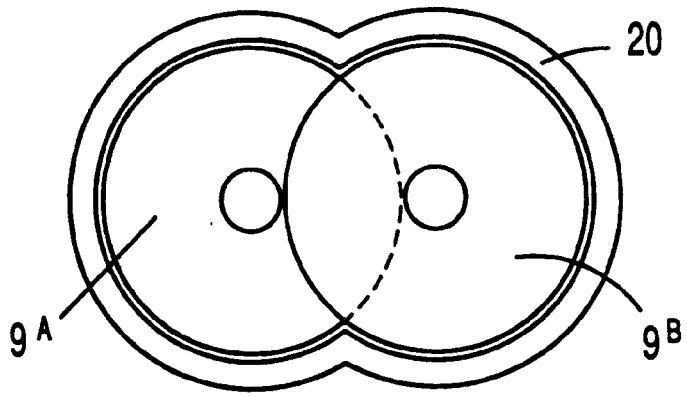
FIG. 3 is a top plan view onto the impeller blades and the housing of FIG. 2.

FIG. 3 is an axial plan view of the impeller system showing the engagement or meshing of the two blades 9A and 9B and the tight placement of the impeller blades inside the walls 20. The positive displacement force of the impeller system is thus only slightly impaired by backflow and leakage between the impeller blades 9A, 9B and the walls 20 and, negligibly, between the axle 31 and the adjacent blade 9A or 9B.

Figure 4:
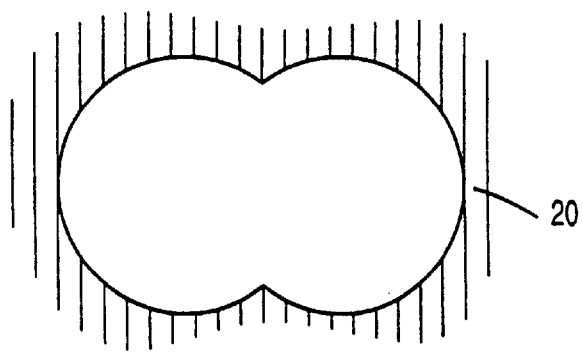
FIG. 4 is a plan view of the housing.

With reference to FIGS. 3 and 4, the housing of the positive displacement system is defined by walls 20 with rotationally symmetrical portions. In the illustrated embodiment with the two interengaging impellers, the housing has two intersecting circular arches that essentially correspond to the periphery of the blades 9A and 9B in their engagement position. A width D of the housing opening in which the impeller spindles are rotatably disposed corresponds to a diameter of the impeller blades 9A, 9B minus the overlap O. The overlap O, in turn, corresponds essentially to the rifling depth of the impellers, i.e., the difference in the radius of the blades 9A, 9B and the radius of the shaft 31. The width D may also be expressed as the sum of two times the diameter d of the shaft 31 plus two times the rifling depth of the impellers.

Figure 5:
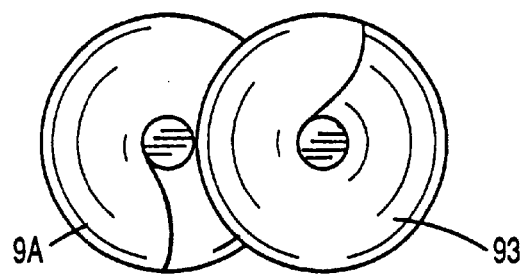
FIG. 5 is a plan view onto the impeller blades.
Figure 6:
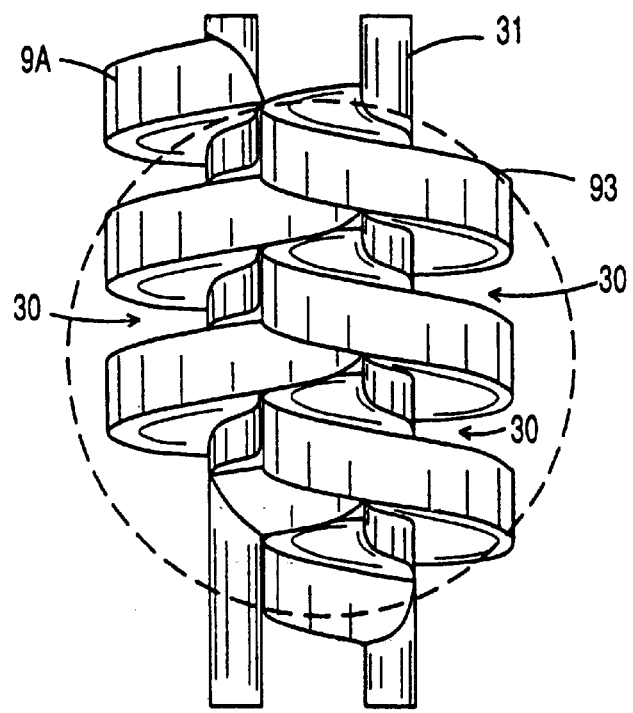
FIG. 6 is a side view of two mutually interengaging blade structures.

As seen in FIGS. 5 and 6, the blades or helical rifling of the blades is offset by approximately 180° so as to distribute the pumping discharge of each of the chambers 30 into the chamber $A_c$. In other words, it is advantageous for the chambers 30 to reach the top position at which they empty into the chamber $A_c$ alternatingly. In the case of two blades, the offset should thereby be in the neighborhood of 180°.

If three or more impeller spindles are used, the housing 20 requires a corresponding modification and, advantageously, the rotary offset of the impeller rifling may be distributed accordingly by 360°/n, where n is the number of impeller spindles.

Figure 7:
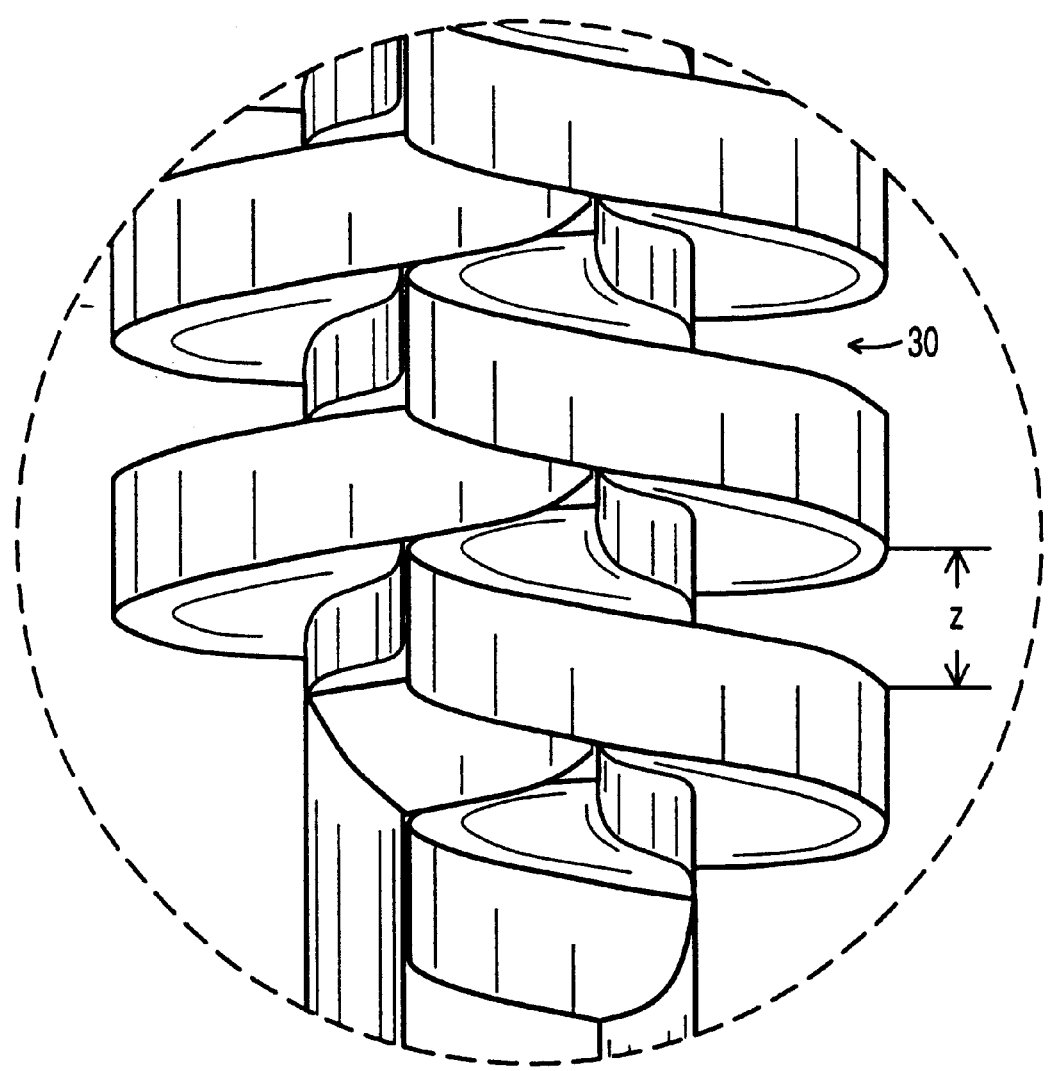
FIG. 7 is an enlarged view of the detail indicated in FIG. 6.

The volume of the chambers 30 and the rotational speed of the impellers defines the pump pressure and the volume displacement per time of the impeller injection. With reference to FIG. 7, the volume of each chamber 30 corresponds approximately to the double integral of the differential rotary angle dθ taken through 360° and the differential radius dr taken from the radius r of the shaft 30 to the radius R of the impeller blade 9A, 9B, multiplied with the blade spacing z, minus the volume portion of the adjacent blade that engages into the space in the center between the two spindles.

I claim:

1. An internal combustion engine assembly, comprising:
   an engine formed with a combustion chamber;
   an input system separate from said combustion chamber and communicating with said combustion chamber for pumping air into said combustion chamber, said input system including two interengaging helix spindle impellers each having a substantially cylindrical axle with a helical blade formed thereon for pumping air into said combustion chamber, and a housing separate from said combustion chamber and having walls substantially sealing against said helix spindle impellers;
   a power output system connected to said combustion chamber for converting energy released in a combustion reaction in said combustion chamber into mechanical work.

2. The internal combustion engine according to claim 1, wherein said housing opening is formed with two intersecting circular arches substantially corresponding to a periphery of said interengaging impellers and substantially airtightly sealing off said housing opening.

3. The internal combustion engine according to claim 1, wherein said blades are oriented almost 90° relative to a rotary axis thereof.

4. An internal combustion engine assembly, comprising:

an engine formed with a combustion chamber; and an input system communicating with said combustion chamber for injecting a fluid into said combustion chamber, said input system including two rotatable, substantially cylindrical axles each carrying a helically rising blade formed to pump the fluid into said combustion chamber, and a housing separate from said combustion chamber and formed with an opening having walls substantially sealing against said blades.

5. The internal combustion engine according to claim 4, wherein said input system is configured to inject a combustion fluid into said combustion chamber.

6. The internal combustion engine according to claim 4, wherein said input system is configured to inject a mixture of air and gas into said combustion chamber.

7. The internal combustion engine according to claim 4, wherein said blades each rise at an angle of between 45° and 90° relative to a rotary axis defined by said rotating axles.

8. The internal combustion engine according to claim 7, wherein said blades are oriented almost 90° relative to a rotary axis defined by said rotating axles.

9. The internal combustion engine according to claim 4, which further comprises a power output system connected to said combustion chamber for converting energy released in a combustion reaction in said combustion chamber into work.

10. The internal combustion engine according to claim 4, wherein said housing opening is formed with two intersecting circular arches substantially corresponding to a periphery of said impeller and substantially air-tightly sealing off said housing opening.

11. An internal combustion engine assembly, comprising:

an engine formed with a combustion chamber; and an input system communicating with said combustion chamber for injecting a fluid into said combustion chamber, said input system including two rotatable, substantially cylindrical axles each carrying a helically rising blade formed to pump the fluid into said combustion chamber, and a housing formed with an opening having walls substantially sealing against said blades, said opening of said housing of said input system being separate from and communicating with said combustion chamber.

12. An internal combustion engine assembly, comprising:

an engine formed with a combustion chamber;

an input system separate from said combustion chamber and communicating with said combustion chamber for pumping air into said combustion chamber, said input system including two interengaging helix spindle impellers each having a substantially cylindrical axle with a helical blade formed thereon for pumping air into said combustion chamber, and a housing having walls substantially sealing against said blades of said helix spindle impellers and being disposed separate from and communicating with said combustion chamber and;

a power output system connected to said combustion chamber for converting energy released in a combustion reaction in said combustion chamber into mechanical work.

* * * * *